US012711424B2

(12) United States Patent
McNeil

(10) Patent No.: US 12,711,424 B2
(45) Date of Patent: Aug. 18, 2026

(54) SYSTEMS AND METHODS FOR DETERMINATION, DESCRIPTION, AND USE OF FEATURE SETS FOR MACHINE LEARNING CLASSIFICATION SYSTEMS, INCLUDING ELECTRONIC MESSAGING SYSTEMS EMPLOYING MACHINE LEARNING CLASSIFICATION

(71) Applicant: Zix Corporation, Dallas, TX (US)

(72) Inventor: Peter Gallagher McNeil, Leesburg, VA (US)

(73) Assignee: ZIX CORPORATION, Dallas, TX (US)

( * ) Notice: Subject to any disclaimer, the term of this patent is extended or adjusted under 35 U.S.C. 154(b) by 781 days.

(21) Appl. No.: 18/160,501

(22) Filed: Jan. 27, 2023

(65) Prior Publication Data

US 2024/0256950 A1 Aug. 1, 2024

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS 11,556,693 B1 1/2023 Khoo
11,887,061 B1 1/2024 McNeil
12,147,948 B2 11/2024 McNeil
2007/0038705 A1 2/2007 Chickering et al.
2013/0179516 A1 7/2013 Tsai
2015/0287336 A1 10/2015 Scheeres
2017/0222960 A1 8/2017 Agarwal et al.
2019/0020672 A1 1/2019 Stolfo et al.
2021/0117853 A1* 4/2021 Lynch ...................... G06N 5/02
2024/0257060 A1 8/2024 McNeil
2025/0037087 A1 1/2025 McNeil

OTHER PUBLICATIONS

Notice of Allowance issued by the U.S. Patent and Trademark Office (USPTO) for U.S. Appl. No. 18/160,496, mailed Oct. 18, 2023, 12 pages.
Notice of Allowance issued by the U.S. Patent and Trademark Office (USPTO) for U.S. Appl. No. 18/528,423, mailed Jul. 25, 2024, 13 pages.
Notice of Allowance issued for U.S. Patent and Trademark Office issued for U.S. Appl. No. 18/914,460, mailed Mar. 4, 2026, 15 pages.

* cited by examiner

*Primary Examiner* — Pei Yong Weng
(74) *Attorney, Agent, or Firm* — Sprinkle IP Law Group

(57) ABSTRACT

Systems and methods for dynamically defining features for machine learning models in classification systems are disclosed. Such systems and methods may be usefully applied to train and utilize machine learning models in a variety of contexts, including email classification systems.

21 Claims, 5 Drawing Sheets

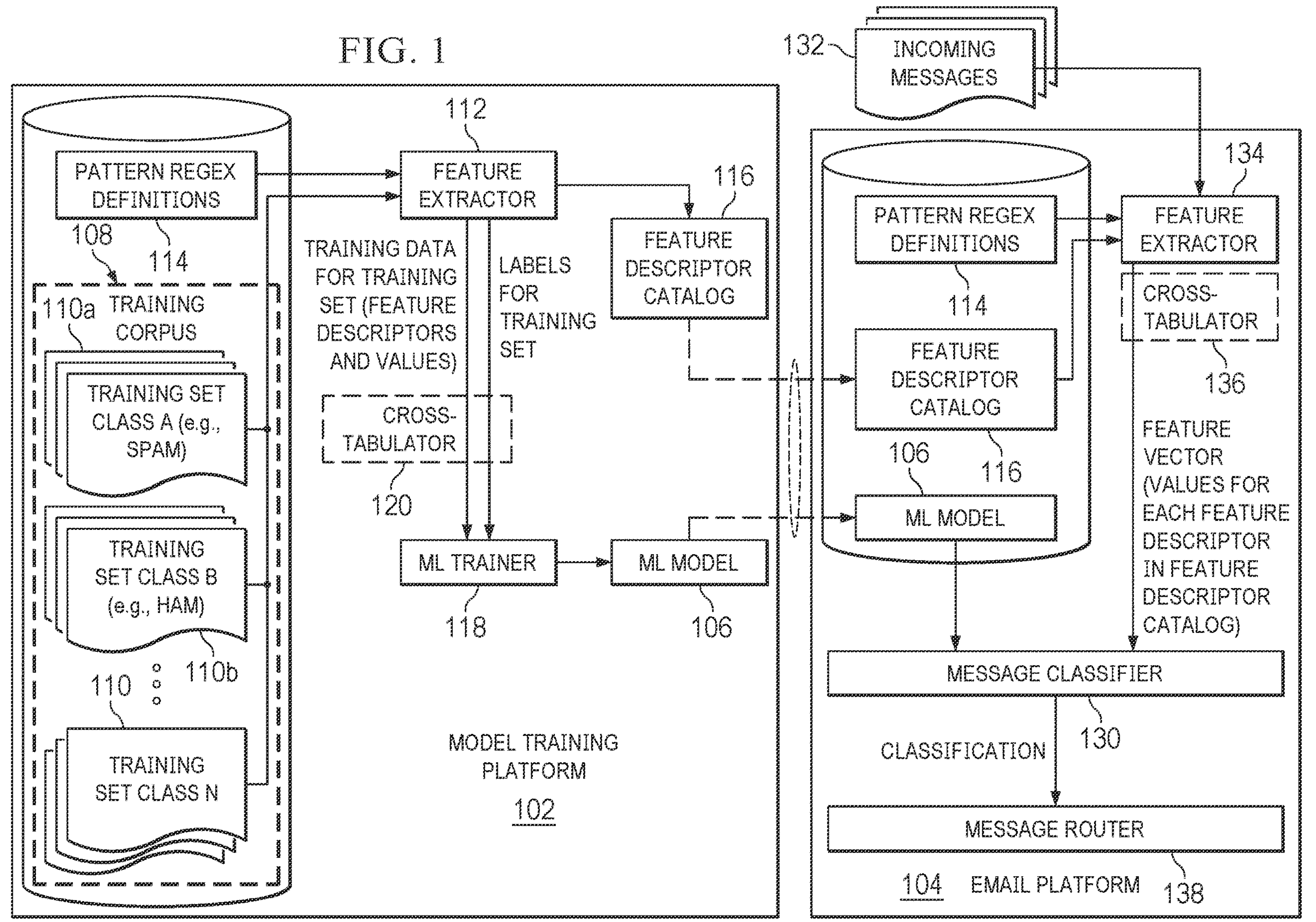
FIG. 1
PATTERN REGEX DEFINITIONS
108
114
110a
TRAINING CORPUS
TRAINING SET CLASS A (e.g., SPAM)
TRAINING SET CLASS B (e.g., HAM)
110b
110
TRAINING SET CLASS N
112
FEATURE EXTRACTOR
TRAINING DATA FOR TRAINING SET (FEATURE DESCRIPTORS AND VALUES)
LABELS FOR TRAINING SET
CROSS-TABULATOR
120
ML TRAINER
118
116
FEATURE DESCRIPTOR CATALOG
ML MODEL
106
MODEL TRAINING PLATFORM
102
132
INCOMING MESSAGES
PATTERN REGEX DEFINITIONS
114
FEATURE DESCRIPTOR CATALOG
106
116
ML MODEL
134
FEATURE EXTRACTOR
CROSS-TABULATOR
136
FEATURE VECTOR (VALUES FOR EACH FEATURE DESCRIPTOR IN FEATURE DESCRIPTOR CATALOG)
MESSAGE CLASSIFIER
CLASSIFICATION
130
MESSAGE ROUTER
104
EMAIL PLATFORM
138

SYSTEMS AND METHODS FOR DETERMINATION, DESCRIPTION, AND USE OF FEATURE SETS FOR MACHINE LEARNING CLASSIFICATION SYSTEMS, INCLUDING ELECTRONIC MESSAGING SYSTEMS EMPLOYING MACHINE LEARNING CLASSIFICATION

TECHNICAL FIELD

This disclosure relates generally to machine learning and electronic messaging. More particularly, this disclosure relates to embodiments of systems and methods for dynamic feature definition, determination and use in training and utilization of machine learning models for classification in messaging systems.

BACKGROUND

In the modern world, the vast majority of documents that are being created, utilized, and maintained are in electronic format. A number of different situations commonly arise that require an analysis or identification of certain types of electronic documents from a relatively large pool of available electronic documents. These types of classification problems crop up in a wide variety of contexts.

One particular example of such a context relates to electronic messaging, including electronic mail or other types of electronic communications (referred to herein collectively as "email" without loss of generality). Specifically, the advent of global communications networks such as the Internet has presented opportunities for reaching vast numbers of people. As a result, the use of email as a means for disseminating advertisements, solicitations, promotions, or other unwanted communications (also denoted as "spam") to users is becoming increasingly pervasive. Commensurately, individuals and entities (e.g., and for profit or non-profit organization) are becoming increasingly inconvenienced by these messages.

A key technique utilized to thwart this spam email is the filtering of email messages intended for users. One proven filtering technique is based upon a machine learning approach—machine learning filters assign to an incoming message a probability that the message is spam or otherwise classify the message as spam or as desirable (referred to also as "ham"). Improvements in spam filtering are highly desirable in order to facilitate the reduction of these unwanted emails. As these filtering techniques usually employ machine learning classification systems, one of the main ways in which such filtering techniques can be improved is the improvement of the underlying machine learning techniques employed by such classification systems.

SUMMARY

To continue with the above discussion, it is highly desirable to filter email messages for users to separate the spam from legitimate messages. In many cases, email classifiers based on machine learning are employed to accomplish this filtering. Typically, in this approach, features are extracted from two (or more) classes of example messages (e.g., spam and ham messages), and a machine learning model is trained to discriminate probabilistically between the two classes based on values for those features. When an email message is received values for those same features can be extracted from the email message (e.g., if they exist) and provided to a classifier configured with the trained machine learning model. The classifier thus provides the values for those features to the trained machine learning model and uses the results of the application of the machine learning model to the values of the features for the incoming message to classify that message.

Accordingly, most email machine learning classification tasks require the identification and extraction of features, both in the training phase for machine learning models and in the "live" phases when such models are used for classification. These features are then used to compute the likelihood of an email belonging to a particular class (e.g., either ham (good email) or spam (unwanted email)). Problematically, the features to extract when training the machine learning model (and thus which features to extract when classifying newly received emails using the trained machine learning model) are defined statically in an a priori manner. Thus, a set of features is defined along with a definition of what to look for (e.g., in a message) for that feature. Values for those features can then be extracted (if present) from messages of a training set to train a machine learning model, and values for those same features are extracted from incoming messages to classify the message using that trained machine learning model.

As may be noticed, the set of features that are extracted from messages may be static across training cycles of the machine learning model. In other words, each time the machine learning model is (re) trained (e.g., on a different set of training messages), the model will be trained based on the extraction of that same set of statically defined features. While the weights, biases, or other influence of those features on the resulting machine learning model may differ between training cycles (or intervals), the set of features does not itself vary. This method of operation is less than ideal, such machine learning techniques fail to adequately account for the actual training messages used for any given training cycle, and are thus sclerotic and lack the ability to adapt to different sets of training messages across training cycles.

What is desired, therefore, are machine learning systems, including classification systems, that allow the dynamic definition of features during training based on the contents of the training set being used to train a machine learning model.

To address these issues, among others, systems, and methods for dynamically defining features for machine learning models in classification systems are disclosed. Such systems and methods may be usefully applied to train and utilize machine learning models in a variety of contexts, including email classification systems. Specifically, according to embodiments, a set of features for a given training cycle are identified dynamically (e.g., on a per training cycle basis) based on what is determined from the (e.g., contents of) the email messages of the training set utilized for that training cycle.

These features can, for example, be extracted by a feature extractor (e.g., at a model training platform that is training the machine learning model). Such a feature extractor or the like may be adapted to utilize a set of regular expression definitions for patterns to fragment a message. Specifically, in one embodiment, during training of an email classification model on a set of training messages of different classes, each training message may be independently fragmented. For each of the fragments of a training message, a feature descriptor can be generated for a feature corresponding to the fragment based on attributes of the fragment, including attributes of a fragment that may be unrelated to the content or value of that fragment (e.g., a field where the fragment was found, a portion (part) of data associated with that fragment, a position of that fragment in the content, a type of value to be derived from that feature, or other data associated with the fragment, collectively referred to herein as feature attributes).

According to certain embodiments, a feature descriptor is generated from a fragment according to an abstract naming scheme that defines values for corresponding portions of the feature descriptor for that feature based on attributes of the fragment such that the feature descriptor is descriptive of the attributes of that fragment. Accordingly, fragments with the same attributes across different messages may cause the same feature descriptor to be generated.

If the feature descriptor generated for a fragment from a training message is not already part of a feature (descriptor) catalog associated with that training cycle (e.g., was not previously identified as a feature that training cycle), that feature descriptor may be added to the feature (descriptor) catalog as a new feature. The value for the feature described by that feature descriptor can then be generated (e.g., the value may be the value of the fragment itself or some value derived from, or descriptive of, the value of the fragment), and the value generated from that fragment for that message assigned to the feature described by that feature descriptor for that message (e.g., the value determined from that fragment is associated with that feature descriptor and that message).

At the end of the processing of the messages of the training set for that training cycle, then, a feature descriptor catalog exists that includes all the (e.g., unique) feature descriptors determined from all the fragments of all the training messages, where those feature descriptors describe all the features to be used to train the machine learning model for that training cycle. As can be seen, as the training messages for each training cycle may differ (e.g., messages may be added to the training set, messages may be removed because of age or other reasons, etc.), the set of features determined from those training messages in a given training cycle may also differ.

The training data for that training cycle thus comprises the values associated with those features (i.e., identified by the feature descriptors comprising the feature descriptor catalog) as determined from the training messages for that training cycle and a set of labels associated with the set of training messages specifying the class associated with each of the training messages. Accordingly, a machine learning model can be trained based on the training data determined for that training cycle.

Once the machine learning model is trained, the (trained) machine learning model can then be deployed for use by a message classifier on one or more email platforms (e.g., an email system that receives and routes incoming messages). The email platform may utilize the machine learning model to classify incoming messages into the one or more classes associated with the machine learning model and make associated routing decisions for the incoming message based on the classification of the message (e.g., dispose of the message, route the message to a particular mailbox, etc.)

According to embodiments, therefore, the machine learning model and the associated feature (descriptor) catalog created when training that machine learning model during the training cycle can be provided to the email platform. As the feature descriptor catalog was created during the same training cycle as the provided machine learning model, the feature descriptor catalog comprises the feature descriptors for the features used to train that machine learning model for an associated training cycle. When an incoming message is received at this email platform, the presence of any features described by that feature descriptor catalog in the incoming message can be determined based on the message and a feature vector (i.e., values for features) for that incoming message generated.

In particular, in one embodiment, an incoming message may be processed by a feature extractor configured similarly to the feature extractor utilized in training the machine learning model. Specifically, the feature extractor at the email platform may be adapted to extract fragments from the incoming email message utilizing the same (or a similar) set of regular expression definitions for patterns as that employed by the feature extractor during the training of the machine learning model. Moreover, the feature extractor at the email platform is adapted to generate a feature descriptor from each extracted fragment in a similar manner to the feature extractor employed during training of the machine learning model. For example, the feature extractor may generate feature descriptors for fragments according to the same abstract naming scheme that defines values for corresponding portions of the feature descriptor based on attributes of the fragment.

Thus, the feature extractor at the email platform may fragment an incoming message (e.g., according to the regular expression patterns). For each of the fragments of the incoming message, a feature descriptor can be generated for the fragment based on the attributes of the fragment according to the abstract naming scheme, or other manner of generating feature descriptors, used by the feature extractor at the email platform.

The value for the feature described by the feature descriptor generated for the fragment can then be determined (e.g., the value may be the value of the fragment itself or some value derived from, or descriptive of, the value of the fragment). A determination can be made if the feature descriptor generated for the fragment is in the feature descriptor catalog comprising the features (i.e., identified by feature descriptors) associated with the machine learning model configured at the email platform. If the feature descriptor generated for the fragment of the incoming message is included in the feature descriptor catalog, the value determined for that fragment from the incoming message may be associated with that feature descriptor and the incoming message (e.g., may be added to a feature vector for the incoming message as the value for the feature identified by the feature descriptor determined based on that fragment). If the feature descriptor determined for the fragment of the incoming message is not included in the feature descriptor catalog, the value may be discarded (e.g., not included in the feature vector for the incoming message).

In this manner, features that are present in the incoming email message may be identified based on feature descriptors generated for fragments of the incoming message in a way similar to the generation of those features during training of the machine learning model. A feature vector comprising values for those features present in the incoming message that are included in the feature descriptor catalog is generated.

The feature vector generated for the incoming message can then be provided to the classifier at the email platform adapted to utilize the machine learning model (i.e., the machine learning trained on the features described in the feature descriptor catalog). The classifier can apply the machine learning model to the feature vector of the incoming message to classify the message (e.g., obtain an identification of a class to which the incoming message has been classified, obtain a numerical likelihood of the incoming message belonging to a class, etc.). The email platform can then make a routing (or other type of) decision for the incoming email message based on the classification of the message.

In one embodiment, features for training the machine learning model may be determined utilizing cross tabulation for the initial features derived from the fragments of the training messages. According to certain embodiments, after the initial feature descriptor catalog is determined from the set of training messages, the feature descriptor catalog (and associated training data) may be supplemented through cross tabulation of two (or more) of the initial features determined from the set of training messages to form higher order features based on the initially determined features. These cross tabulation features may be added to the feature descriptor catalog, wherein the feature descriptor for that cross tabulation feature may include the feature descriptor for each of the initial features along with one or more characters indicating it is a cross tabulation feature associated with those initial feature descriptors. Moreover, the values associated with that cross tabulation feature may be included in the training data for that training cycle and used to train the machine learning model for that training cycle.

Embodiments can therefore include systems and methods for feature set extraction that receive a corpus of training content and parse at least a portion of the training content to generate a plurality of features and a plurality of features from cross-tabulations for those initial features. A value can be generated for each of the plurality of features along with a classification value for each of the cross-tabulations of the features. Live content can be received and parsed based on the plurality of features to identify one or more of the features in the live content. A value can be generated for each of the identified one or more features in the live content including generation of classification values for features associated with the cross-tabulations of the identified features in the live content. Based on the generated classification value for each of the cross-tabulations of the identified one or more features in the live content, the live content can be classified.

In some cases, the training content comprises a plurality of training emails and the plurality of features comprises email addresses of the plurality of training emails. The email addresses can comprise an email from address, an email to address, an email reply to address, an email cc address and an email bcc address. These email addresses can be divided into segments comprising a domain segment, a local segment, and a friendly segment and generating a value for each of the plurality of features can include generating a unique training hash for the domain segment, a unique training hash for the local segment, and a unique training hash for the friendly segment of each of the email addresses in the plurality of training emails, each unique training hash associated with a feature value and a feature structure.

In one embodiment, a classification value for each of the cross-tabulations of the features is based on at least one of the feature values and the feature structure of the unique training hashes.

In some embodiments, the live content comprises a plurality of live emails and the plurality of identified features comprises email addresses of the plurality of live emails. Generating a value for each of the identified one or more features in the live content can include generating a unique live hash for the domain segment, a unique live hash for the local segment, and a unique live hash for the friendly segment of each of the email addresses in the plurality of live emails, each live unique hash associated with a feature value and a feature structure. Generating a classification value for each of the cross-tabulations of the identified one or more features in the live content can be based on at least one of the feature values and the feature structure of the unique live hashes.

In particular embodiments, the corpus of training content is a corpus of first training content received at a first time and the plurality of features is a plurality of first features. A corpus of second training content may be received at a second time different from the first time where at least a portion of the second training content is parsed to generate a plurality of second features and a plurality of second cross-tabulations for the second features. One or more of the second features can correspond to one or more of the first features.

A value for each of the plurality of second features can be generated along with a classification value for each of the cross-tabulations of the second features. A corpus of second live content can be received and parsed based on the plurality of second features to identify one or more of the second features in the second live content. a value for each of the identified one or more second features in the second live content can be generated and a classification value for each of the cross-tabulations of the identified one or more second features in the live second content can be generated. Based on the generated classification value for each of the cross-tabulations of the identified one or more second features in the second live content, the second live content can be classified.

According to embodiments, the plurality of features and the generated classification values for each of the cross-tabulations of the features may be used to train a machine learning model and the machine learning model used to classify the live content.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 1 is a block diagram of one embodiment of an email classification system that dynamically defines features for a machine learning model used in email classification.

DETAILED DESCRIPTION

Figure 2A:
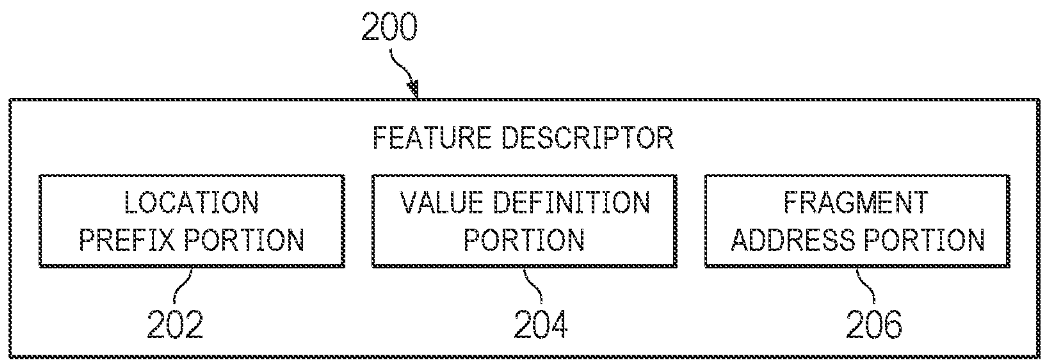
FIGS. 2A and 2B are depictions of feature descriptors.

The disclosure and various features and advantageous details thereof are explained more fully with reference to the exemplary, and therefore non-limiting, embodiments illustrated in the accompanying drawings and detailed in the following description. It should be understood, however, that the detailed description and specific examples, while indicating the preferred embodiments, are given by way of illustration only and not by way of limitation. Descriptions of known programming techniques, computer software, hardware, operating platforms, and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before describing embodiments in more detail, it may be helpful to discuss some context around filtering in email platforms. Namely, email classifiers based on machine learning are employed to filter spam email in email platforms. Typically, in this approach, features are extracted from two (or more) classes of example messages (e.g., spam and ham messages), and a machine learning model is trained to discriminate probabilistically between the two classes based on values for those features. When an email message is received, values for those same features can be extracted from the email message (e.g., if they exist) and provided to a classifier configured with the trained machine learning model. The classifier thus provides the values for those features to the trained machine learning model and uses the results of the application of the machine learning model to the values of the features for the incoming message to classify that message.

Accordingly, most email machine learning classification tasks require the identification and extraction of features, both in the training phase for machine learning models and in the "live" phases when such models are used for classification. These features are then used to compute the likelihood of an email belonging to a particular class (e.g., either ham (good email) or spam (unwanted email)). Problematically, the features to extract when training the machine learning model (and thus which features to extract when classifying newly received emails using the trained machine learning model) are defined statically in an a priori manner. Thus, a set of features is defined along with a definition of what to look for (e.g., in a message) for that feature. Values for those features can then be extracted (if present) from messages of a training set to train a machine learning model, and values for those same features are extracted from incoming messages to classify the message using that trained machine learning model.

As may be noticed, the set of features that are extracted from messages may be static across training cycles of the machine learning model. In other words, each time the machine learning model is (re) trained (e.g., on a different set of training messages), the model will be trained based on the extraction of that same set of statically defined features. While the weights, biases, or other influence of those features on the resulting machine learning model may differ between training cycles (or intervals), the set of features does not itself vary. This method of operation is less than ideal, such machine learning techniques fail to adequately account for the actual training messages used for any given training cycle, and are thus sclerotic and lack the ability to adapt to different sets of training messages across training cycles.

What is desired, therefore, are machine learning systems, including classification systems, that allow the dynamic definition of features during training based on the contents of the training set being used to train a machine learning model.

To address these issues, among others, systems and methods for dynamically defining features for machine learning models in classification systems are disclosed. Such systems and methods may be usefully applied to train and utilize machine learning models in a variety of contexts, including electronic messaging systems that may classify messages. Specifically, in certain embodiments, features used to train a machine learning model are dynamically determined based on fragments that are actually found in training messages, where those features are described abstractly using feature descriptors formed according to a naming scheme that describes found fragments. The features to train the machine learning model thus comprise the feature descriptors describing the fragments found in the training messages.

As such, when that machine learning model is deployed for use in classification of messages, values for those features can be determined from incoming messages and associated with the features through the use of the feature descriptor. Namely, a fragment found in an incoming message can be described by creating a feature descriptor defining the found fragment using the same naming scheme. In this manner, a value for that fragment for the incoming message may be associated with the feature of the machine learning model having that same feature descriptor. These values for features as determined from the incoming message and associated with those features through the feature descriptor Turning then to FIG. 1, one embodiment of an email classification system that dynamically defines features for a machine learning model used in email classification is depicted. The email classification system may include a model training platform 102 for training a machine learning model 106 for use in email classification, and an email platform 104 that employs that machine learning model 106 for classifying email messages. It will be noted that the model training platform 102 and the email platform 104 may be deployed on, or including, the same, or different, computing devices and may be deployed directly on physical computing devices, deployed on virtual computing devices, or deployed as one or more instances in a cloud based computing environment. Other configurations are possible and are fully contemplated herein.

Model training platform 102 may have access to training corpus 108 comprising a set of training messages 110. These training messages 110 may each be associated with a different class (e.g., training messages 110*a* may be associated with a label designating these messages as spam while training messages 110*b* may be associated with a label designating these messages as ham). The determination of which messages of the training set 110 belong to each class may be determined in almost any manner desired, and may, for example, be the result of a previous automated or manual classification that resulted in the assignment of the message to a particular class.

At a certain interval (e.g., an interval corresponding to a training cycle) a machine learning model 106 may be trained on the messages comprising the training set 110 at that point. The training messages 110 for each training cycle may differ between these training cycles. For example, messages may be added to the training set 110, messages may be removed from the training set 110 (e.g., because of age or other reasons, etc.).

When a training cycle for training the machine learning model 106 is initiated, feature extractor 112 may dynamically identify a set of features for that training cycle based on the messages of the training sets 110 utilized for that training cycle. According to one embodiment, feature extractor 112 is adapted to utilize a set of regular expression definitions 114 for patterns to fragment a message. During training of machine learning model 106 on a set of training messages 110 of different classes, each training message may be independently fragmented. For each of the fragments of a training message, a feature descriptor can be generated for a feature corresponding to the fragment based on attributes of the fragment, including attributes of a fragment that may be unrelated to the content or value of that fragment (e.g., a field where the fragment was found, a portion (part) of data associated with that fragment, a position of that fragment in the content, a type of value to be derived from that feature, or other data associated with the fragment).

According to certain embodiments, a feature descriptor is generated from a fragment by the feature extractor 112 according to an abstract naming scheme that defines values for corresponding portions of the feature descriptor for that feature based on attributes of the fragment such that the feature descriptor is descriptive of the attributes of that fragment. Accordingly, fragments with the same attributes across different messages may cause the same feature descriptor to be generated.

If the feature descriptor generated for a fragment from a training message is not already part of a feature descriptor catalog 116 associated with that training cycle (e.g., was not previously identified as a feature that training cycle), that feature descriptor may be added to the feature descriptor catalog 116 as a new feature. The value for the feature described by that feature descriptor can then be generated by the feature extractor 112 (e.g., the value may be the value of the fragment itself or some value derived from, or descriptive of, the value of the fragment). Feature extractor 112 can assign the value generated from that fragment for that message to the feature described by that feature descriptor for that message (e.g., the value determined from that fragment is associated with that feature descriptor and that message).

At the end of the processing of the messages of the training set 110 for that training cycle by feature extractor 112, feature descriptor catalog 116 includes all the (e.g., unique) feature descriptors determined from all the fragments of all the training messages 110, where those feature descriptors describe all the features to be used to train the machine learning model 106 for that training cycle. As can be seen, as the training messages 110 for each training cycle may differ (e.g., messages may be added to the training set, messages may be removed because of age or other reasons, etc.), the set of features determined from those training messages 110 in a given training cycle may also differ.

The training data for that training cycle thus comprises the values associated with those features (i.e., identified by the feature descriptors comprising the feature descriptor catalog) as determined from the training messages for that training cycle and a set of labels associated with the set of training messages specifying the class associated with each of the training messages 110. It will be noted here that while features described with respect to the training and use of the machine learning model 106 for email classification are described as determined from the fragments of the sets of messages of the training messages 110, these features may be combined with other features, and the machine learning model 106 may be trained based on these other features in addition to the features determined from the fragments of the set of messages without loss of generality. These other features may include features not derived directly from fragments, including architecture of the message, construction of the message, delivery methodology, relationship to other messages, etc.

In one embodiment, for example, cross tabulator 120 may determine additional features for training the machine learning model 106 utilizing cross tabulation for the initial features derived from the fragments of the training messages 110 by feature extractor 112. According to certain embodiments, after the initial feature descriptor catalog 116 is determined from the set of training messages 110, cross tabulator 120 may supplement the feature descriptor catalog 116 (and associated training data) through cross tabulation of two (or more) of the initial features determined from the set of training messages 110 to form higher order features based on the initially determined features (e.g., included in the feature descriptor catalog 116).

To determine which cross tabulation features to add to the feature descriptor catalog 116, in one embodiment, for every permutation of two initial features described by two feature descriptors of the feature descriptor catalog 116, cross tabulator 120 can determine if that cross tabulation feature exhibits an information gain above a certain threshold. To determine if the information gain for a cross tabulation feature is above threshold, cross tabulator 120 can determine if the values for the two initial features comprising the cross tabulation feature are the same for each message of the training set 110 (e.g., are the values for the two initial features determined for a message the same for that message). If the values for the two initial features are the same for a message, the value of that cross tabulation feature for that message may indicate that similarity (e.g., be set to a one), while if the values for the two initial features are different for the message (e.g., or do not exist for the message) the value of that cross tabulation feature for that message may indicate that difference (e.g., be set to a zero).

Once the values for the crass tabulation feature are determined for each message, cross tabulator 120 can determine, based on the labels for each of the messages of the training set 110 designating which class that message belongs to, whether that cross tabulation feature provides a threshold amount of information gain based on the number of messages of each class that have a value for that cross tabulation feature indicating a same value for the initial features comprising the cross tabulation feature. For example, it can be determined how many messages in each class of messages have a value for that cross tabulation feature indicating the same value for the initial features comprising that cross tabulation feature (e.g., where the value of the cross tabulation feature is set to one). If the ratio of the number message of one class that have the same value to the number of messages of another class is sufficiently high (e.g., above a 1:5, 1:10, 1:25, etc. ratio), the cross tabulation feature may be deemed to have information gain above a threshold.

If that cross tabulation feature exhibits an information gain above the threshold, the cross tabulation feature may be added to the feature descriptor catalog 116, wherein the feature descriptor for that cross tabulation feature may include the feature descriptor for each of the initial features along with one or more characters indicating it is a cross tabulation feature associated with those initial feature descriptors. Moreover, the values associated with that cross tabulation feature may be included in the training data for that training cycle and used to train the machine learning model 106 for that training cycle.

The training data for that training cycle thus comprises the values associated with those features (i.e., identified by the feature descriptors comprising the feature descriptor catalog 116) as determined from the training messages 110 for that training cycle and a set of labels associated with the set of training messages 110 specifying the class associated with each of the training messages 110. Accordingly, machine learning trainer 118 may train machine learning model 106 based on the training data determined for that training cycle. Such a machine learning model 106 may, for example, be a machine learning model that may be used for a classifier, including decision tree models such as a (e.g., random) decision forest model, logistic regression, support vector machine, K nearest neighbor, naive bayes, or almost any other type of machine learning model desired.

Once the machine learning model 106 is trained, the (trained) machine learning model 106 can then be deployed for use by a message classifier 130 on email platform 104 (e.g., an email system that receives and routes incoming messages). The email platform 104 may utilize the machine learning model 106 to classify incoming messages 132 into the one or more classes associated with the machine learning model 106 and make associated routing decisions for the incoming message 132 based on the classification of the message (e.g., dispose of the message, route the message to a particular mailbox, etc.).

According to embodiments, therefore, the machine learning model 106 and the associated feature (descriptor) catalog 116 created when training that machine learning model 106 during the training cycle can be provided to the email platform 104. As the feature descriptor catalog 116 was created during the same training cycle as the provided machine learning model 106, the feature descriptor catalog 116 comprises the feature descriptors for the features used to train that machine learning model 106 for the associated training cycle. When an incoming message 132 is received at the email platform 104, the presence of any features described by that feature descriptor catalog in the incoming message can be determined based on the message 132 and a feature vector (i.e., values for features) for that incoming message 132 generated by the email platform 104.

In particular, in one embodiment, an incoming message 132 may be processed by feature extractor 134 at the email platform 104 where the feature extractor 134 is configured similarly to the feature extractor 112 utilized in training the machine learning model 106 at the model training platform 102. Specifically, the feature extractor 134 at the email platform 104 may be adapted to extract fragments from the incoming email message 132 utilizing the same (or a similar) set of regular expression definitions 114 for patterns as that employed by the feature extractor 112 during the training of the machine learning model 106. Moreover, the feature extractor 134 at the email platform 104 is adapted to generate a feature descriptor from each extracted fragment in a similar manner to the feature extractor 112 employed during training of the machine learning model 106. For example, the feature extractor 134 may generate feature descriptors for fragments according to the same abstract naming scheme that defines values for corresponding portions of the feature descriptor based on attributes of the fragment.

Thus, the feature extractor 134 at the email platform may fragment an incoming message (e.g., according to the regular expression patterns 114). For each of the fragments of the incoming message 132, a feature descriptor can be generated for the fragment based on the attributes of the fragment according to the abstract naming scheme, or other manner of generating feature descriptors, used by the feature extractor 134 at the email platform 104.

The value for the feature described by the feature descriptor generated for the fragment can then be determined (e.g., the value may be the value of the fragment itself or some value derived from, or descriptive of, the value of the fragment). A determination can be made by the feature extractor 134 if the feature descriptor generated for the fragment is in the feature descriptor catalog 116 comprising the features (i.e., identified by feature descriptors) associated with the machine learning model 106 configured at the email platform 104. If the feature descriptor generated for the fragment of the incoming message 132 is included in the feature descriptor catalog 116, the value determined for that fragment from the incoming message 132 may be associated with that feature descriptor and the incoming message 132 (e.g., may be added to a feature vector for the incoming message 132 as the value for the feature identified by the feature descriptor determined based on that fragment).

If the feature descriptor determined for the fragment of the incoming message 132 is not included in the feature descriptor catalog 116, the value may be discarded (e.g., not included in the feature vector for the incoming message). It will be noted that, in certain embodiments, the presence of the feature descriptor for a fragment in the feature descriptor catalog 116 may be ascertained before a value for that feature is generated by feature extractor 134 to avoid spending computing resources to generate the value in cases where the feature descriptor generated for the fragment is not in the feature descriptor catalog 116.

In this manner, features that are present in the incoming email message 132 may be identified based on feature descriptors generated for fragments of the incoming message 132 in a way similar to the generation of those features during training of the machine learning model 106. A feature vector comprising values for those features present in the incoming message that are included in the feature descriptor catalog is generated. When all fragments of the incoming message have been evaluated, any features identified in the feature descriptor catalog that are not present in the incoming message may be assigned a default value (e.g., NULL, zero, one, etc.) in the feature vector for the incoming message. Accordingly, for those feature descriptors included in the feature descriptor catalog where a corresponding feature descriptor was not generated during processing of the fragments of the incoming message (and thus no value was included for that feature descriptors in the feature vector for the incoming message) the default value may be included in association with those feature descriptors in the feature vector for the incoming message.

In cases where the feature descriptor catalog 116 includes cross tabulation features, values for those cross tabulation features may be determined for the incoming message 132 by cross tabulator 136. In particular, after feature extractor 134 forms the feature vector for the incoming message 132 based on extracted fragments, the cross tabulator 136 may determine if feature descriptor catalog 116 includes any cross tabulation features. These features may be determined by analyzing the feature descriptors of the feature descriptor catalog 116 to determine if any of those feature descriptors include one or more characters indicating it is a cross tabulation feature, as discussed. For any cross tabulation feature descriptors found in the feature descriptor catalog 116, cross tabulator 136 may determine the feature descriptors comprising that cross tabulation feature from the feature descriptor of that cross tabulation feature (e.g., by parsing the feature descriptor of the cross tabulation feature to determine the feature descriptors comprising that cross tabulation feature).

The cross tabulator 136 can then determine the value for that cross tabulation feature based on the values associated with the component feature descriptors for the incoming message 132. For example, if the values for the component features of that cross tabulation feature are the same for the incoming message 132 in the feature vector for that message 132, the value of that cross tabulation feature for that message 132 in the feature vector for that message may be set to indicate that similarity (e.g., be set to a one), while if the values for the component features of that cross tabulation feature are different for the message 132 (e.g., or do not exist for the message 132) the value of that cross tabulation feature for that message 132 in the feature vector for that message 132 may be set to indicate that difference (e.g., be set to a zero).

The feature vector generated for the incoming message 132 can then be provided to the classifier 130 at the email platform 104 adapted to utilize the machine learning model 106 (i.e., the machine learning model 106 trained on the features described in the feature descriptor catalog 116). The classifier 130 can apply the machine learning model 106 to the feature vector of the incoming message 132 to classify the message 132 (e.g., obtain an identification of a class to which the incoming message has been classified, obtain a numerical likelihood of the incoming message belonging to a class, etc.). The email platform 104 can then utilize message router 138 to make a routing (or other type of) decision for the incoming email message 132 based on the classification of the message.

As can be seen, because the features used to train a machine learning model and classify incoming messages are dynamically determined based on fragments that are actually found in the messages, and described abstractly using feature descriptors formed according to a naming scheme that describes such features, the features that are actually used to train these models and classify incoming messages may change across training cycles based on the actual contents of the training sets used while still allowing values for fragments determined from an incoming message to be associated with those features by constructing an associated feature descriptor from fragments obtained from incoming messages according to the same naming convention.

Looking then at FIG. 2A, a depiction of one embodiment of a naming scheme for a feature descriptor for a feature is depicted. Feature descriptor 200 may include a location prefix portion 202, a value definition portion 204, and a fragment address portion 206. These portions 202, 204, 206 may be separated by tokens in the feature descriptor 200 (e.g., a " " other token) indicating the end of one portion 202, 204, 206 or the beginning of the next portion 202, 204, 206.

The location portion 202 of a feature descriptor 200 for a fragment may indicate a portion of the email message from which a fragment was obtained, such as a header or body of an email message or the field (e.g., From, To, Reply To, CC, BCC,) from which the fragment was obtained. For example, if a fragment was obtained from the "To" field in a header of an email message the location portion 202 of the feature descriptor for the fragment may be "ht" (e.g., the "h" indicating that the fragment was from the header and the "t" indicating it was from the "To" field in the header), if the fragment was obtained from the "From" field in a header of an email message the location portion 202 of the feature descriptor for the fragment may be "hf", if the fragment was obtained from the "CC" field in a header of an email message the location portion 202 of the feature descriptor for the fragment may be "hc", if the fragment was obtained from the "Reply To" field in a header of an email message the location portion 202 of the feature descriptor for the fragment may be "hr", etc.

The value definition portion 204 of the feature descriptor 200 may indicate a feature type (e.g., type of value) associated with the feature descriptor (e.g., a value hash representing a hash of the content of the fragment, a hash representing a structure, etc.). For example, if the value to be generated for the feature is a hash of the value of (the content of) a fragment the value definition portion may be "valhash" or the like, if the value to be generated for the feature is a hash of a representation of a structure of a fragment the value definition portion may be "structhash" or the like, if the value to be generated for the feature is the actual content of the fragment the value definition portion may be "content" or the like.

The fragment address portion 206 of the feature descriptor 202 may indicate an order of a fragment relative to other fragments. For example, with respect to an email address the fragment address portion 206 of the feature descriptor 200 for the fragment address portion 206 may indicate an ordinal position of that email address within the field within which that fragment was found. To illustrate, a "0" may indicate the fragment was from the first email address within the a field (e.g., as specified in the location portion 202 of that feature descriptor), a "1" may indicate the fragment was from the second email address within the field, etc.

The fragment address portion 206 may also include an indication of a type of that fragment. For example, for a fragment determined from an email address the fragment address portion 206 may indicate what part of an email address the fragment belonged to, a domain segment of the email address (e.g. using a "d" in the fragment address portion), a local part of the email address (e.g., using a "l" in the fragment address portion), or a friendly part of the email address (e.g., using a "f" in the fragment address portion).

The fragment address portion 206 can also include an indication of a position of that fragment relative to other fragments extracted from a particular segment of the email address. For example, the indication of position may indicate the ordering of a fragment of an email address relative to other fragments determined from an email address.

As discussed, in some embodiments, cross tabulation features may be formed from two or more features determined when training a machine learning model. Feature descriptors may be formed for those cross tabulation features based on the feature descriptors of the features related by that cross tabulation feature.

Figure 2B:
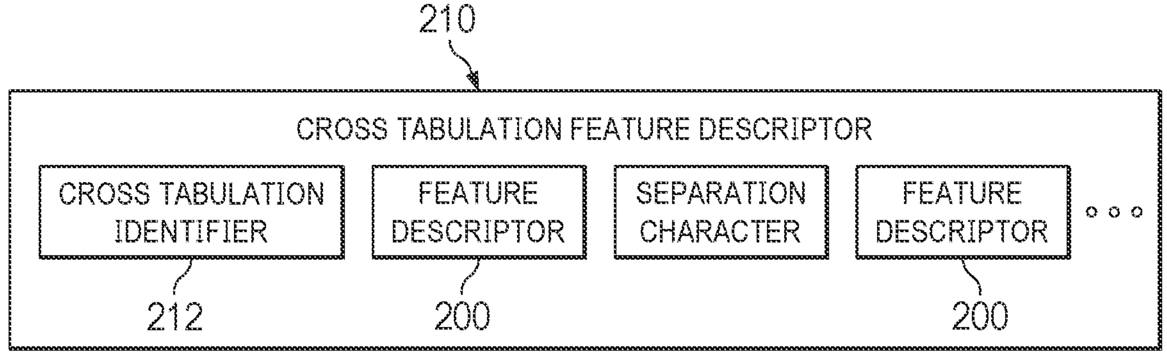

FIG. 2B is a depiction of one embodiment of a naming scheme for a feature descriptor for a cross tabulation feature. Here, the cross tabulation feature descriptor 210 may include a cross tabulation identifier 212 which is a character string (e.g., "x*") that may identify the feature descriptor as describing a cross tabulation feature. Following this cross tabulation identifier 212, the feature descriptors 200 of each feature being related by the cross tabulation feature descriptor 210 are included in the cross tabulation feature descriptor 210 where each of the included feature descriptors 200 may be separated by a descriptor separation character 214 (e.g., "*"). To illustrate an example, a cross tabulation feature descriptor formed based on two feature descriptors "featuredescriptor1" and "featuredescriptor2" may be "x*featuredescriptor1*featuredescriptor2".

Figure 3:
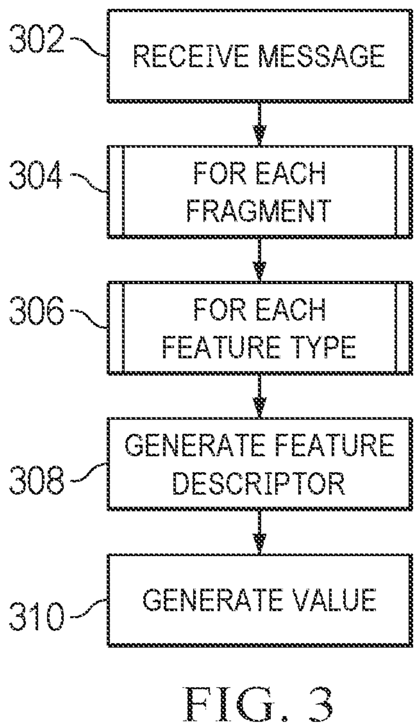
FIG. 3 is a block diagram of one embodiment of determining feature descriptors and associated values.

FIG. 3 depicts one embodiment of a method for generating feature descriptors from a message and an associated value for that feature descriptor. Such a method may be employed, for example, by a feature extractor at both a model training platform and an email classification platform. Initially, when an email message is received (STEP 302), a portion (e.g., the header or a body) of an email message may be segmented (e.g., parsed or otherwise separated, chunked or portioned) to determine a set of fragments for the message (STEP 304) These fragments may include email addresses determined from fields in a header of the message or portions thereof, including fragments from a domain segment of the email address, fragments from a local portion of the email address or fragments from a friendly segment of an email address.

For each of the fragments of the message (STEP 306) and for each feature type to be determined from that fragment (STEP 308), a feature descriptor can be generated based on attributes of the fragment and the feature type (STEP 310) (e.g., there is feature descriptor generated for each feature type to be generated from a fragment).

For example, the header of an email message may be evaluated based on a set of regular expressions or the like to determine all the email addresses in the From, To, Reply To, CC, Cc and BCC fields in the header of the email message. Data about the portion of the email (e.g., the header) and which field each email address was obtained from may also be maintained along with the position of each email address within that field (e.g., whether the email address was the first email address in the "From" field, the second email address in the From field, etc.).

Each email address from each field can then be broken down into segments. Specifically, each email address may be broken down into its domain part, its local part and its friendly part (e.g., if the email address included a friendly portion). In some embodiments, these segments may be processed backwards from their human readable format in order to more efficiently, or easily, process fragments from email addresses in order of their importance.

Each of the segments may be considered its own fragment, or if there are multiple portions of that segment (e.g., separated by a certain type of token (such as ".") that segment may be broken down further into its component segments. The segment that each fragment was obtained from along with its position within that segment may also be maintained.

To illustrate an example, suppose an email address "Joe" Jsmith2@zixcorp.us.com is determined to be the first email address in the "From" field of an email message (e.g., a training message during training of a machine learning model or an incoming message to be classified using a trained machine learning model). This email address may be broken down into the following segments (again keeping in mind that the parts of the email address may be determined in reverse of their human readable order): the domain part comprising "moc.su.procxiz", the local part comprising "2htimsJ" and the friendly part "eoJ". The domain part can be further broken down into its component segments: "moc", "su", and "procxiz".

Thus, the fragments of this email address (and the associated maintained data) may be "moc" (from the 0 (first) position in the email address), "su" (from the 1 (second) position in the email address), "procxiz" (from the 2 (third) position in the email address), "2htimsJ" (from the 3 (fourth) position in the email address), and "eoJ" (from the 4 (fifth) position in the email address).

One or more feature types may be created from each of these fragments for use in training a machine learning model or in classifying the message. Each feature type may have the value for that type of feature created in a different manner. For example, a value hash feature type may create the value for that feature type by hashing the content of a corresponding fragment with a hashing algorithm. For features of this type then, fragments with identical content will have the same value for that feature.

As another example, a feature type that may be created may represent the structure of a fragment. Here, a structural representation of a fragment may be composed by replacing each letters of the fragment with the same character (e.g., "$") replacing all the digits of the fragment with another character (e.g., "#").

A hash can be taken of that structural representation of the fragment to create the value for that feature type. As such, fragments that do not have identical content but that have the same "shape" characteristics (e.g., same number of characters with letters and numbers in the identical positions) may have the same value. For example, for the fragment "moc" the structural representation may be "$$$" and thus the value for a feature of this type for the fragment "moc" would be the hash of "$$$". Similarly the structural representation of "2htimsJ" would be "#$$$$$$" and the value for a feature of this type for the fragment "2htimsJ" would be the hash of "#$$$$$$".

Each of feature type may be associated with an identifier that identifies that feature type. For example, a feature type identifier "valhash" may be used to identify feature type whose values is based on a hash of the content of a fragment while "structhash" may be used to identify feature types whose values is based on hashes of structural representations of the content of a fragment.

Thus, a feature descriptor for the fragments determined from of an email message may be created based on, and may include portions identifying, the portion of the email from which the fragment was obtained (e.g., the header), the field from which the email address including that fragment was obtained (e.g., the "From" field), the type of feature (e.g., a value, a structural representation, etc.), the ordinal position of the email address from which the fragment was obtained within the field from which the email was obtained, the segment (e.g., local, domain, friendly) from which the fragment was obtained and the position of that fragment within the email address. In this manner the feature descriptor can uniquely describe the fragment.

In one specific embodiment, the feature descriptor includes a first character representing the portion of the email from which the fragment was obtained (e.g., "h" for header) and a second character representing the field from which the email address including that fragment was obtained (e.g., an "f" for the "from" field). The feature descriptor may also include an identifier of a feature type (e.g., "valhash" or "structhash"), along with a character representing the ordinal position of the email address from which the fragment was obtained within the field from which the email address was obtained, a character representing the segment from which the fragment was obtained (e.g., "l" for local, "d" for domain, and "f" for friendly) and a character representing the position of that fragment within the email address.

To continue with the above example, a feature descriptor for a content value hash feature type for the fragment "moc" of the example illustrated above may be "hf_valhash_0d0", where the "h" designates that the email address that the "moc" fragment was obtained from was obtained from the header of an email message, the "f" designates that the "moc" fragment was obtained from the "From" field of the email message, the "valhash" portion of the feature descriptor designates that the value for this feature is obtained by taking a hash of the content of a fragment, the first "0" character designates that the email address the "moc" fragment was obtained from was the first email address in the field from which it was obtained (e.g., the "From" field), the "d" designates that the "moc" fragment was obtained from the domain segment of the email address and the "0" character designates that the "moc" fragment was the first fragment in the email address. The value associated with that fragment descriptor would thus be the hash value of the string "moc" (referred to as "hash (moc)").

Similarly, a feature descriptor for a feature type whose value is based on a hash of a structural representation for the fragment "moc" of the example illustrated above may be "hf_structhash_0d0". Again, the "h" designates that the email address that the "moc" fragment was obtained from was obtained from the header of an email message, the "f" designates that the "moc" fragment was obtained from the "From" field of the email message, the first "0" character (e.g., in the "0d0" portion of the feature descriptor) designates that the email address the "moc" fragment was obtained from was the first email address in the field from which it was obtained (e.g., the "From" field), the "d" designates that the "moc" fragment was obtained from the domain segment of the email address, and the last "0" character designates that the "moc" fragment was the first fragment in that email address. Here, however, the "valhash" portion of the feature descriptor designates that the value for this feature is obtained by taking a hash of a structural representation of the fragment. The value associated with that fragment descriptor would thus be the hash value of a structural representation of "moc", such as "$$$" (e.g., the value for this feature descriptor for the fragment "moc" would be "hash ($$$)").

Now suppose a new email message is being processed (e.g., from a training set to determine training data or an incoming message to be classified) and an email address "Larry" larry15@bigcorp.net is determined to be the first email address in the "From" field of the header of that email message. This email address may again be broken down into the following segments (keeping in mind that the parts of the email address may be determined in reverse of their human readable order): the domain part comprising "ten.procgib", the local part comprising "51yrral" and the friendly part "yrral". The domain part can be further broken down into its component segments: "ten", and "procgib".

Thus, the fragments of this email address (and the associated maintained data) may be "ten" (from the 0 (first) position in the email address), "procgib" (from the 1 (second) position in the email address), "51yrral" (from the 2 (third) position in the email address), and "yrral" (from the 3 (fourth) position in the email address).

Accordingly, feature descriptors for a content value hash feature type for the fragment "ten" of the example illustrated above may be "hf_valhash_0d0", where the "h" designates that the email address that the "ten" fragment was obtained from was obtained from the header of an email message, the "f" designates that the "ten" fragment was obtained from the "From" field of the email message, the "valhash" portion of the feature descriptor designates that the value for this feature is obtained by taking a hash of the content of a fragment, the first "0" character designates that the email address the "ten" fragment was obtained from was the first email address in the field from which it was obtained (e.g., the "From" field), the "d" designates that the "ten" fragment was obtained from the domain segment of the email address and the "0" character designates that the "ten" fragment was the first fragment obtained from that email address. The value associated with that fragment descriptor would thus be the hash value of the string "ten" (referred to as "hash (ten)").

As such, notice that the feature descriptor (hf_valhash_0d0) for this fragment ("ten") determined from the email address "Larry" larry15@bigcorp.net is the exact same as the feature descriptor for the fragment ("moc") determined for the "Joe" Jsmith2@zixcorp.us.com email address as illustrated in the example above. Additionally notice, that the value for the feature described by this same feature descriptor will be different between these two email messages (e.g., hash (moc) for the above example and hash (ten) for this example).

Similarly, a feature descriptor for a feature type whose value is based on a hash of a structural representation for the fragment "ten" of this example may be "hf_structhash_0d0". Again, the "h" designates that the email address that the "ten" fragment was obtained from the header of an email message, the "f" designates that the "ten" fragment was obtained from the "From" field of the email message, the first "0" character (e.g., in the "0d0" portion of the feature descriptor) designates that the email address the "ten" fragment was obtained from was the first email address in the field from which it was obtained (e.g., the "From" field), the "d" designates that the "ten" fragment was obtained from the domain segment of the email address, and the last "0" character designates that the "ten" fragment was the first fragment in that email address. Here, however, the "valhash" portion of the feature descriptor designates that the value for this feature is obtained by taking a hash of a structural representation of the fragment. The value associated with that fragment descriptor would thus be the hash value of a structural representation of "ten", such as "$$$" (e.g., the value for this feature descriptor for the fragment "ten" would be "hash ($$$)").

Notice here then that the feature descriptor (hf_structhash_0d0) for this fragment ("ten") determined from the email address "Larry" larry15@bigcorp.net is the exact same as the feature descriptor for the fragment ("moc") determined for the "Joe" Jsmith2@zixcorp.us.com email address as illustrated in the example above. For this feature type notice that the value for the feature described by this same feature descriptor will now be the same between these two email messages as (e.g., hash($$$) for the above example and hash ($$$) for this example), as the structure of these two fragments is the same.

Thus, following that same naming scheme the following tables represent the feature descriptors and associated values for each of the fragments obtained from the example email addresses "Joe" Jsmith2@zixcorp.us.com determined to be the first email address in the "From" field of an email message, and the example email address "Larry" larry15@bigcorp.net determined to be the first email address in the "From" field of the header of another email message.

For the email address "Joe" Jsmith2@zixcorp.us.com:

| Fragment | Feature Descriptor | Value | Explanation |
|---|---|---|---|
| moc (com) | hf_valhash_0d0 | hash(moc) | h = header, f = From field, valhash = value hash based feature type, 0 = first email address in field, d = domain segment, 0 = first fragment from email address |
| su (us) | hf_valhash_0d1 | hash(us) | h = header, f = From field, valhash = value hash based feature type, 0 = first email address in field, d = domain segment, 1 = second fragment from email address |
| procxiz (zixcorp) | hf_valhash_0d2 | hash(procxiz) | h = header, f = From field, valhash = value hash based feature type, 0 = first email address in field, d = domain segment, 2 = third fragment from email address |
| 2htimsJ (Jsmith2) | hf_valhash_0l3 | hash(2htimsJ) | h = header, f = From field, valhash = value hash based feature type, 0 = first email address in field, l = local segment, 3 = fourth fragment from email address |
| eoJ (Joe) | hf_valhash_0f4 | hash(eoJ) | h = header, f = From field, valhash = value hash based feature type, 0 = first email address in field, f = friendly segment, 4 = fifth fragment from email address |
| moc (com) | hf_structhash_0d0 | hash($$$) | h = header, f = From field, structhash = structural representation hash based feature type, 0 = first email address in field, d = domain segment, 0 = first fragment from email address |
| su (us) | hf_structhash_0d1 | hash($$) | h = header, f = From field, structhash = structural representation hash based feature type, 0 = first email address in field, d = domain segment, 1 = second fragment from email address |
| procxiz (zixcorp) | hf_structhash_0d2 | hash($$$$$$$) | h = header, f = From field, structhash = structural representation hash based feature type, 0 = first email address in field, d = domain segment, 2 = third fragment from email address |
| 2htimsJ (Jsmith2) | hf_structhash_0l3 | hash(#$$$$$$) | h = header, f = From field, structhash = structural representation hash based feature type, 0 = first email address in field, l = local segment, 3 = fourth fragment from email address |
| eoJ (Joe) | hf_structhash_0f4 | hash($$$) | h = header, f = From field, structhash = structural representation hash based feature type, 0 = first email address in field, f = friendly segment, 4 = fifth fragment from email address |

For the email address "Larry" larry15@bigcorp.net:

| Fragment | Feature Descriptor | Value | Explanation |
|---|---|---|---|
| ten (net) | hf_valhash_0d0 | hash(net) | h = header, f = From field, valhash = value hash based feature type, 0 = first email address in field, d = domain segment, 0 = first fragment from email address |
| procgib (bigcorp) | hf_valhash_0d1 | hash(procgib) | h = header, f = From field, valhash = value hash based feature type, 0 = first email address in field, d = domain segment, 1 = second fragment from email address |
| 51yrral (larry15) | hf_valhash_0l2 | hash(51yrral) | h = header, f = From field, valhash = value hash based feature type, 0 = first email address in field, l = domain segment, 2 = third fragment from email address |
| yrraL (Larry) | hf_valhash_0f3 | hash(yrral) | h = header, f = From field, valhash = value hash based feature type, 0 = first email address in field, f = friendly segment, 3 = fourth fragment from email address |

-continued

| Fragment | Feature Descriptor | Value | Explanation |
|---|---|---|---|
| ten (net) | hf_structhash_0d0 | hash($$$) | h = header, f = From field, structhash = structural representation hash based feature type, 0 = first email address in field, d = domain segment, 0 = first fragment from email address |
| procgib (bigcorp) | hf_structhash_0d1 | hash($$$$$$$) | h = header, f = From field, structhash = structural representation hash based feature type, 0 = first email address in field, d = domain segment, 1 = second fragment from email address |
| 51yrral (larry15) | hf_structhash_0l2 | hash(##$$$$$) | h = header, f = From field, structhash = structural representation hash based feature type, 0 = first email address in field, l = local segment, 2 = third fragment from email address |
| yrraL (Larry) | hf_structhash_0f3 | hash($$$$$) | h = header, f = From field, structhash = structural representation hash based feature type, 0 = first email address in field, f = friendly segment, 3 = fourth fragment from email address |

Figure 4A:
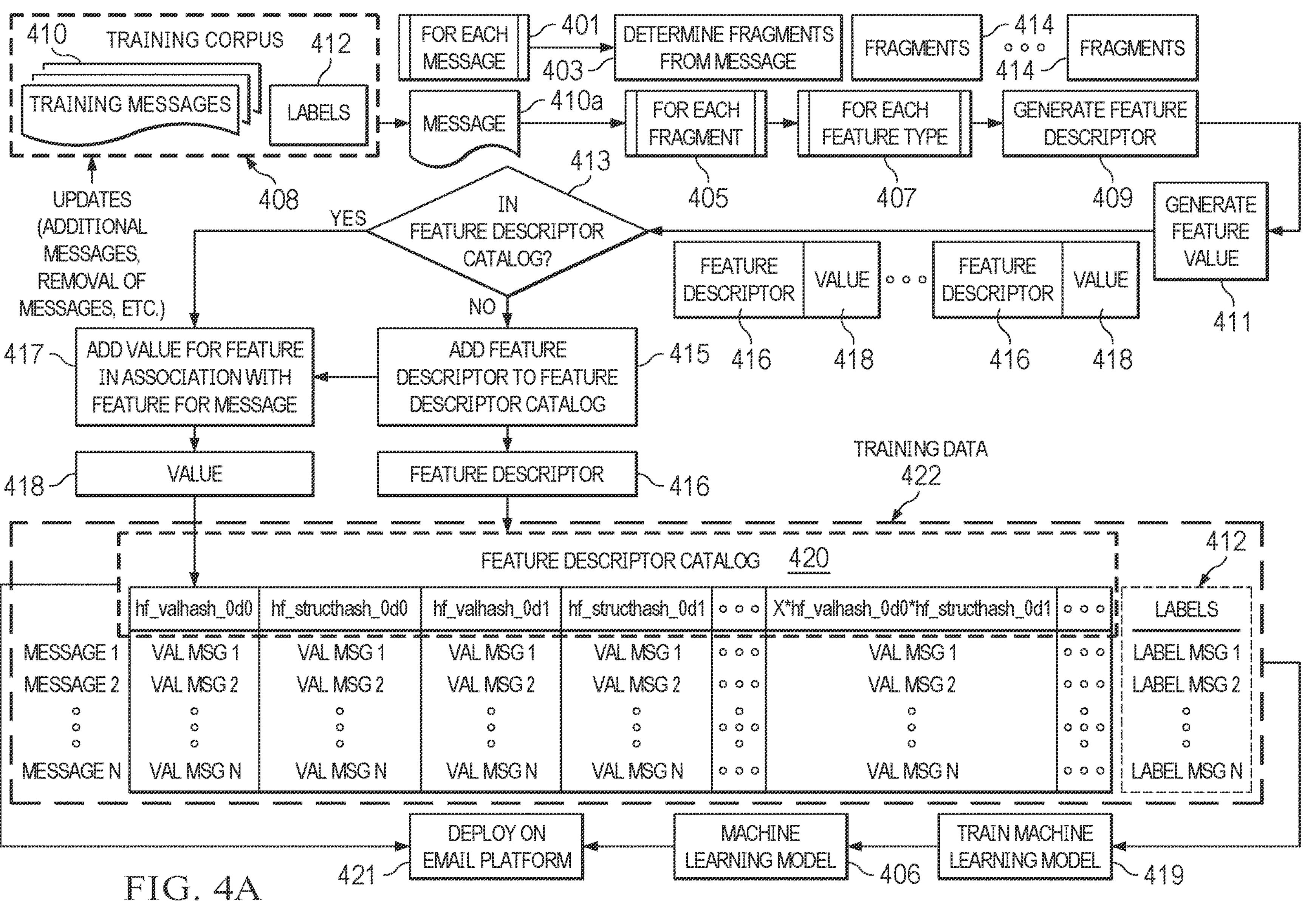
FIGS. 4A and 4B are hybrid diagrams of embodiments of methods for the training and utilization of dynamic features in machine learning models used for classification in messaging systems.
Figure 4B:
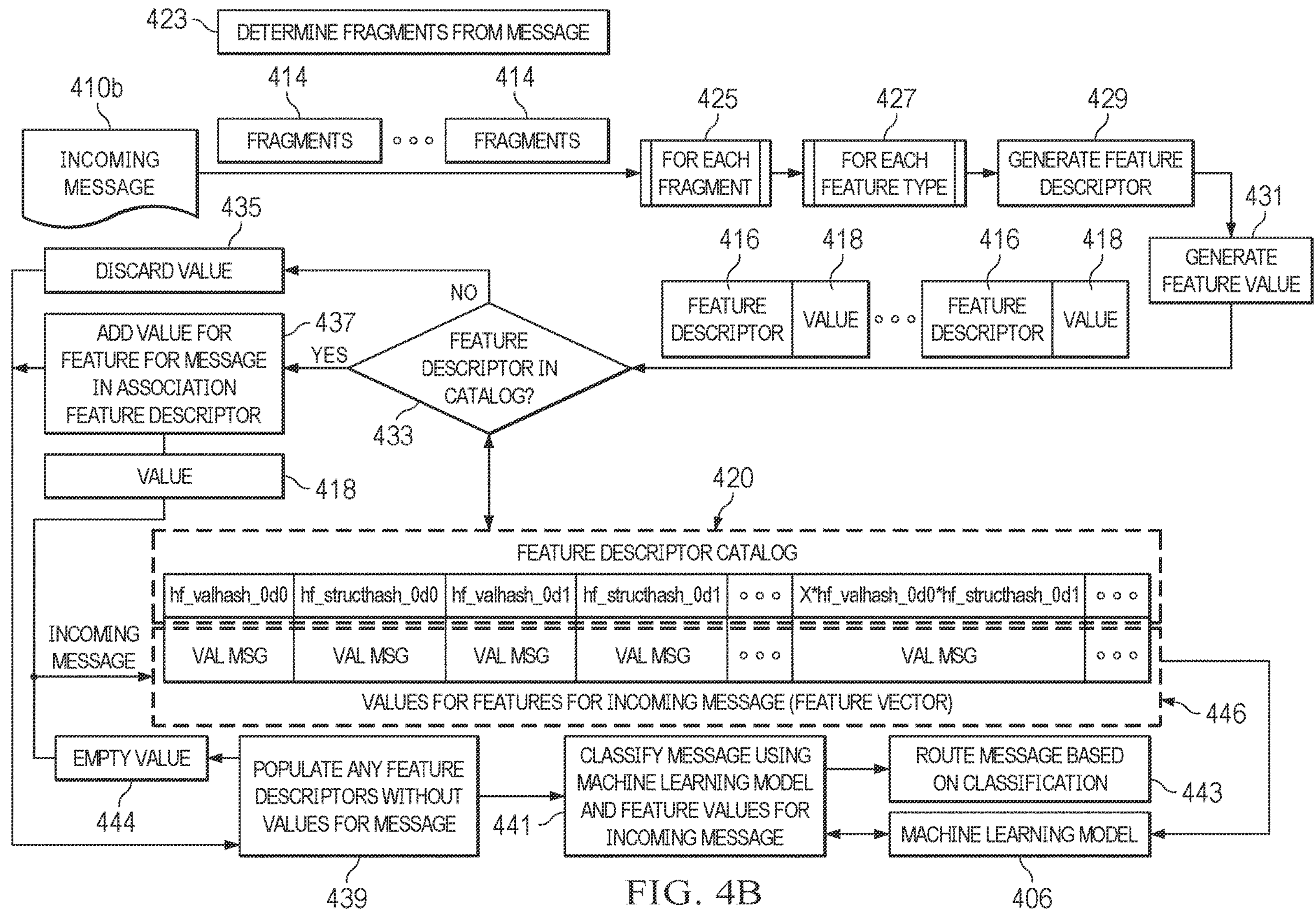

FIGS. 4A and 4B depict embodiments of methods for dynamically determining and using features of a machine learning model in email classification. Referring initially to FIG. 4A, one embodiment of a method for training a machine learning model for email classification that may be employed by a model training platform or the like is depicted. A training corpus 408 comprising a set of training messages 410 may be accessed. These training messages 410 may each be associated with a different class (e.g., some training messages 340 may be associated with a label 412 designating these messages as spam while some training messages 410 may be associated with a label 412 designating these messages 410 as ham).

At a certain interval (e.g., an interval corresponding to a training cycle) a machine learning model 406 may be trained on the messages comprising the training set 410 at that point. The training messages 410 for each training cycle may differ between these training cycles. For example, messages may be added to the training set 410, messages may be removed from the training set 410 (e.g., because of age or other reasons, etc.).

When a training cycle for training the machine learning model 406 is initiated, each message 410*a* (STEP 401) of the training set 410 may be processed. When a message 410*a* is processed a set of fragments 414 are determined from that message 410*a* (STEP 403). A set of regular expression definitions for patterns may be used to fragment the message 410*a*. These fragments may include email addresses determined from fields in a header of the message 410*a* or portions thereof, including fragments from a domain segment of the email address, fragments from a local portion of the email address or fragments from a friendly segment of an email address.

For each of the fragments 414 of the training message 410*a* (STEP 405) and for each feature type to be determined from that fragment (e.g., content value hash based feature type, structural representation based feature type, etc.) (STEP 407), a feature descriptor 416 can be generated based on attributes of the fragment and the feature type (STEP 409) (e.g., there is feature descriptor 414 generated for each feature type to be generated from a fragment 414). Additionally, a value 418 for that fragment 414 for that feature type is generated (STEP 411). The value for the feature described by that feature descriptor may be the value of the fragment itself or some value derived from, or descriptive of, the value of the fragment. Thus, for each fragment of the message 410*a* and each feature type determined from that fragment 414 there may be an associated feature descriptor 416 and value 418.

Such a feature descriptor 416 may be generated based on data associated with the fragment or feature type, such as a field where the fragment was found, a portion (part) of data associated with that fragment, a position of that fragment in the content, a type of value to be derived from that feature, or other data associated with the fragment or feature type. According to certain embodiments, a feature descriptor 416 is generated from a fragment 414 according to an abstract naming scheme that defines values for corresponding portions of the feature descriptor 416 for that feature based on attributes of the fragment or feature type such that the feature descriptor 416 is descriptive of the attributes of that fragment or feature type. Fragments 414 with the same attributes across different messages 410 may thus cause the same feature descriptor 416 to be generated.

For each of the feature descriptors 416 and associated feature values 418 generated from the fragments 414 it can be determined if that feature descriptor 417 is in the feature descriptor catalog 420 comprising all the feature descriptors 416 generated from all the training messages 410 previously processed during that training cycle (STEP 413).

If the feature descriptor 416 generated for a fragment 414 and feature type from the training message 410*a* is not already part of a feature descriptor catalog 420 associated with that training cycle (e.g., was not previously identified as a feature that training cycle from other training messages 410) (N branch of STEP 413), that feature descriptor 416 may be added to the feature descriptor catalog 420 as a new feature (STEP 415). The value 418 associated with the feature descriptor 416 can be added to the feature described by that feature descriptor 416 for that message 410*a* (STEP 417) (e.g., the value 418 determined from that fragment 414 for that feature type is associated with the feature descriptor 416 and that message 410*a*).

At the end of the processing of the messages 410 of the training corpus 408 for that training cycle, feature descriptor catalog 420 includes all the (e.g., unique) feature descriptors 416 determined from all the fragments 414 of all the training messages 410, where those feature descriptors 416 describe all the features to be used to train the machine learning model 406 for that training cycle. As can be seen, as the training messages 410 for each training cycle may differ (e.g., messages 410 may be added to the training corpus 408, messages 410 may be removed because of age or other reasons, etc.), the set of features (feature descriptors 416) determined from those training messages 410 in a given training cycle may also differ.

The training data 422 for that training cycle thus comprises the values 418 associated with those features (i.e., identified by the feature descriptors 416 comprising the feature descriptor catalog 420) as determined from the training messages 410 for that training cycle and the set of labels 412 associated with the set of training messages 410 specifying the class associated with each of the training messages 410.

Accordingly, a machine learning model 406 can be trained (STEP 419) based on the training data 422 determined for that training cycle. Such a machine learning model 406 may, for example, be a machine learning model 406 that may be used for a classifier, including decision tree models such as a (e.g., random) decision forest model, logistic regression, support vector machine, K nearest neighbor, naive bayes, or almost any other type of machine learning model desired.

Once the machine learning model 406 is trained, the (trained) machine learning model 406 can then be deployed for use by a message classifier on am email platform (STEP 421) The email platform 104 may utilize the machine learning model 106 to classify incoming messages 132 into the one or more classes associated with the machine learning model 106 and make associated routing decisions for the incoming message 132 based on the classification of the message (e.g., dispose of the message, route the message to a particular mailbox, etc.).

According to embodiments, therefore, the machine learning model 406 and the associated feature (descriptor) catalog 420 created when training that machine learning model 406 during the training cycle can be provided to the email platform. As the feature descriptor catalog 420 was created during the same training cycle as the provided machine learning model 406, the feature descriptor catalog 420 comprises the feature descriptors 416 for the features used to train that machine learning model 406 for the associated training cycle.

Moving now to FIG. 4B, one embodiment of a method for utilizing a machine learning model trained utilizing dynamic feature determination for email classification that may be employed by an email platform or the like is depicted.

When an incoming message 410*b* is received at an email platform the presence of any features described by that feature descriptor catalog 420 in the incoming message 410*b* can be determined based on the message 410*b*, and a feature vector 446 (i.e., values for features) for that incoming message 410*b* generated.

In particular, in one embodiment the message 410*b* is processed to determine a set of fragments 414 from that message 410*b* (STEP 423). A set of regular expression definitions for patterns may be used to fragment the message 410*b*, where the set of regular expression are the same or similar to that used by a model training platform. These fragments 414 may include email addresses determined from fields in a header of the message 410*b* or portions thereof, including fragments from a domain segment of the email address, fragments from a local portion of the email address or fragments from a friendly segment of an email address.

For each of the fragments 414 of the incoming message 410*b* (STEP 425) and for each feature type to be determined from that fragment (e.g., content value hash based feature type, structural representation based feature type, etc.) (STEP 427), a feature descriptor 416 can be generated based on attributes of the fragment and the feature type (STEP 429) (e.g., there is feature descriptor 414 generated for each feature type to be generated from a fragment 414). Additionally, a value 418 for that fragment 414 for that feature type is generated (STEP 431). The value 418 for the feature described by that feature descriptor 416 may be the value of the fragment itself or some value derived from, or descriptive of, the value of the fragment. Thus, for each fragment 414 of the message 410*b* and each feature type determined from that fragment 414 there may be an associated feature descriptor 416 and value 418.

Such a feature descriptor 416 may be generated in the same manner as the generation of feature descriptors by the model training platform. In particular, the feature descriptor may be generated based on data associated with the fragment 414 or feature type, such as a field where the fragment was found, a portion (part) of data associated with that fragment, a position of that fragment in the content, a type of value to be derived from that feature, or other data associated with the fragment or feature type. According to certain embodiments, a feature descriptor 416 is generated from a fragment 414 according to the same abstract naming scheme as the model training platform that defines values for corresponding portions of the feature descriptor 416 for that feature based on attributes of the fragment or feature type such that the feature descriptor 416 is descriptive of the attributes of that fragment 414 or feature type. Fragments 414 with the same attributes across different messages 410 may thus cause the same feature descriptor 416 to be generated (e.g., at both the model training platform and the email platform).

For each of the feature descriptors 416 and associated feature values 418 generated from the fragments 414 it can be determined if that feature descriptor 417 is in the feature descriptor catalog 420 provided from the model training platform (STEP 433). If the feature descriptor 416 generated for a fragment 414 and feature type from the incoming message 410*b* is not in feature descriptor catalog 420 (N branch of STEP 433), the value 418 associated with that feature descriptor 416 (STEP 415) may be discarded (STEP 435). If, however, the feature descriptor 416 generated for a fragment 414 and feature type from the incoming message 410*b* is included in the feature descriptor catalog 420 (Y branch of STEP 437) the value 418 associated with the feature descriptor 416 can be added to the feature described by that feature descriptor 416 for the incoming message 410*b* (STEP 437) (e.g., the value 418 may be added to feature vector 446 for the incoming message 410*b* as the value for the feature identified by that feature descriptor 416).

In this manner, features that are present in the incoming email message 410*b* may be identified based on feature descriptors 416 generated for fragments 414 of the incoming message 410*b* in a way similar to the generation of those features during training of the machine learning model 406 being used by the email platform to classify incoming messages 410*b*. A feature vector 446 comprising values for those features present in the incoming message 410*b* that are included in the feature descriptor catalog 446 is generated. When all fragments 414 of the incoming message 410*b* have been evaluated, any features identified in the feature descriptor catalog 420 that are not present in the incoming message may be assigned a default (empty) value 444 (e.g., NULL, zero, one, etc.) in the feature vector 446 for the incoming message (STEP 439). Accordingly, for those feature descriptors included in the feature descriptor catalog 446 where a corresponding feature descriptor 416 was not generated during processing of the fragments 414 of the incoming message 410*b* (and thus no value 418 was included for that feature descriptor in the feature vector 446 for the incoming message 410*b*) the default value may be included in association with those feature descriptors in the feature vector 446 for the incoming message.

The feature vector 446 generated for the incoming message 410*b* can then be used to classify the incoming message 410*b* at the email platform using the machine learning model 406 (i.e., the machine learning model 406 trained on the features described in the feature descriptor catalog 420) (STEP 441). The machine learning model 406 can be applied to the feature vector 446 of the incoming message 410*b* to classify the message 410*b* (e.g., obtain an identification of a class to which the incoming message has been classified, obtain a numerical likelihood of the incoming message belonging to a class, etc.). The incoming message then makes a routing (or other type of) decision for the incoming email message 410*b* based on the classification of the message (STEP 443).

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein. Rather, the description is intended to describe illustrative embodiments, features and functions in order to provide a person of ordinary skill in the art context to understand the invention without limiting the invention to any particularly described embodiment, feature, or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a CPU, at least one read-only memory ("ROM"), at least one random access memory ("RAM"), at least one hard drive ("HD"), and one or more input/output ("I/O") device (s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, Javascript, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines, or portions thereof described herein, where such software programming or code can be stored in a computer-readable medium and can be operated on by a processor to permit a computer to perform any of the steps, operations, methods, routines, or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such a computer-readable medium shall generally be machine readable and include software programming or code that can be human readable (e.g., source code) or machine readable (e.g., object code). Examples of non-transitory computer-readable media can include random access memories, read-only memories, HDs, data cartridges, magnetic tapes, floppy diskettes, flash memory drives, optical data storage devices, CD-ROMs, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals, or other information. A processor can include a system with a general-purpose CPU, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, that follow, a term preceded by "a set", "a" or "an" (and "the" when antecedent basis is "a" or "an") includes both singular and plural of such term, unless clearly indicated otherwise (i.e., that the reference "a set", "a" or "an" clearly indicates only the singular or only the plural). Also, as used in the description herein the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:

1. A method for feature creation in machine learning models, comprising:

processing each of a plurality of training documents of a training corpus, the training documents associated with a class label, wherein a set of features for a current training cycle is dynamically determined based on fragments generated from the training documents of the training corpus for the current training cycle, and wherein the processing of each training document comprises:

determining a first fragment from the training document based on parsing the training document using a set of pattern definitions to segment content of the training document into fragments;

determining a first feature descriptor for the first fragment, the first feature descriptor determined based on attributes of the first fragment according to an abstract naming schema that defines portions of the first feature descriptor based on those attributes, wherein the abstract naming schema encodes at least: (i) a location portion indicating a source field from which the fragment was obtained, (ii) a value definition portion indicating a type of value to be derived from the fragment, and (iii) a fragment address portion indicating a position of the fragment relative to other fragments;

determining a value associated with the first feature descriptor based on the first fragment and based on the type of value indicated by the value definition portion;

adding the first feature descriptor to a feature descriptor catalog when the determined first feature descriptor is not in the feature descriptor catalog, wherein the feature descriptor catalog is dynamically populated during processing of the training corpus such that the features used to train the machine learning model vary between training cycles based on actual content of the training documents; and adding the value for the first feature to training data in association with the first feature descriptor and the training document;

training the machine learning model based on the training data such that features of the trained machine learning model comprise feature descriptors determined for fragments of the training document of the training corpus, wherein the training data comprises the values for feature descriptors for the training documents and the class label associated with the training documents, and wherein the features used to train the machine learning model for the current training cycle differ from features used in a different training cycle based on differences in fragments generated based on training documents between the training cycles; and providing the feature descriptor catalog and the trained machine learning model to a classification system for use in classification of documents, wherein the classification system uses the abstract naming schema to generate feature descriptors for fragments of an incoming document such that a feature descriptor generated for a fragment of the incoming document matches a corresponding feature descriptor in the feature descriptor catalog when the fragment has attributes that match attributes of a fragment from the training corpus.

2. The method of claim 1, wherein the documents are email messages.

3. The method of claim 2, wherein the first fragment is determined from an email address from the header of the email message.

4. The method of claim 3, wherein the first fragment is determined from a segment of the email address, the segment comprising a local part, domain part or friendly part of the email address.

5. The method of claim 4, wherein the class label comprises a spam label.

6. The method of claim 1, further comprising:

receiving an incoming document;

determining a set of second fragments from the incoming document;

for each second fragment:

determining a second feature descriptor for the second fragment, the second feature descriptor determined based on attributes of the second fragment according to the abstract naming schema that defines portions of the second feature descriptor based on those attributes;

determining a value associated with the second feature descriptor based on the second fragment; and when the second feature descriptor is in the feature descriptor catalog, adding the value for the second feature descriptor to a feature vector for the incoming document in association with the second feature descriptor; and classifying the incoming document by applying the trained machine learning model to the feature vector for the incoming document.

7. The method of claim 6, further comprising assigning default values for feature descriptors of the feature descriptor catalog that have no assigned values in the feature vector.

8. A system for training and use of machine learning models in document classification, comprising:

a processor;

a non-transitory computer-readable medium comprising instructions for:

processing each of a plurality of training documents of a training corpus, the training documents associated with a class label, wherein a set of features for a current training cycle is dynamically determined based on fragments generated from the training documents of the training corpus for the current training cycle, and wherein the processing of each training document comprises:

determining a first fragment from the training document based on parsing the training document using a set of pattern definitions to segment content of the training document into fragments;

determining a first feature descriptor for the first fragment, the first feature descriptor determined based on attributes of the first fragment according to an abstract naming schema that defines portions of the first feature descriptor based on those attributes, wherein the abstract naming schema encodes at least: (i) a location portion indicating a source field from which the fragment was obtained, (ii) a value definition portion indicating a type of value to be derived from the fragment, and (iii) a fragment address portion indicating a position of the fragment relative to other fragments;

determining a value associated with the first feature descriptor based on the first fragment and based on the type of value indicated by the value definition portion;

adding the first feature descriptor to a feature descriptor catalog when the determined first feature descriptor is not in the feature descriptor catalog, wherein the feature descriptor catalog is dynamically populated during processing of the training corpus such that the features used to train the machine learning model vary between training cycles based on actual content of the training documents; and adding the value for the first feature to training data in association with the first feature descriptor and the training document;

training the machine learning model based on the training data such that features of the trained machine learning model comprise feature descriptors determined for fragments of the training document of the training corpus, wherein the training data comprises the values for feature descriptors for the training documents and the class label associated with the training documents, and wherein the features used to train the machine learning model for the current training cycle differ from features used in a different training cycle based on differences in fragments generated based on training documents between the training cycles; and providing the feature descriptor catalog and the trained machine learning model to a classification system for use in classification of documents, wherein the classification system uses the abstract naming schema to generate feature descriptors for fragments of an incoming document such that a feature descriptor generated for a fragment of the incoming document matches a corresponding feature descriptor in the feature descriptor catalog when the fragment has attributes that match attributes of a fragment from the training corpus.

9. The system of claim 8, wherein the documents are email messages.

10. The system of claim 9, wherein the first fragment is determined from an email address from the header of the email message.

11. The system of claim 10, wherein the first fragment is determined from a segment of the email address, the segment comprising a local part, domain part or friendly part of the email address.

12. The system of claim 11, wherein the class label comprises a spam label.

13. The system of claim 8, wherein the instructions are further for:

receiving an incoming document;

determining a set of second fragments from the incoming document;

for each second fragment:

determining a second feature descriptor for the second fragment, the second feature descriptor determined based on attributes of the second fragment according to the abstract naming schema that defines portions of the second feature descriptor based on those attributes;

determining a value associated with the second feature descriptor based on the second fragment; and when the second feature descriptor is in the feature descriptor catalog, adding the value for the second feature descriptor to a feature vector for the incoming document in association with the second feature descriptor; and classifying the incoming document by applying the trained machine learning model to the feature vector for the incoming document.

14. The system of claim 13, wherein the instructions are further for: assigning default values for feature descriptors of the feature descriptor catalog that have no assigned values in the feature vector.

15. A non-transitory computer readable medium, comprising instructions for:

processing each of a plurality of training documents of a training corpus, the training documents associated with a class label, wherein a set of features for a current training cycle is dynamically determined based on fragments generated from the training documents of the training corpus for the current training cycle, and wherein the processing of each training document comprises:

determining a first fragment from the training document based on parsing the training document using a set of pattern definitions to segment content of the training document into fragments;

determining a first feature descriptor for the first fragment, the first feature descriptor determined based on attributes of the first fragment according to an abstract naming schema that defines portions of the first feature descriptor based on those attributes, wherein the abstract naming schema encodes at least: (i) a location portion indicating a source field from which the fragment was obtained, (ii) a value definition portion indicating a type of value to be derived from the fragment, and (iii) a fragment address portion indicating a position of the fragment relative to other fragments;

determining a value associated with the first feature descriptor based on the first fragment and based on the type of value indicated by the value definition portion;

adding the first feature descriptor to a feature descriptor catalog when the determined first feature descriptor is not in the feature descriptor catalog, wherein the feature descriptor catalog is dynamically populated during processing of the training corpus such that the features used to train the machine learning model vary between training cycles based on actual content of the training documents; and adding the value for the first feature to training data in association with the first feature descriptor and the training document;

training the machine learning model based on the training data such that features of the trained machine learning model comprise feature descriptors determined for fragments of the training document of the training corpus, wherein the training data comprises the values for feature descriptors for the training documents and the class label associated with the training documents, and wherein the features used to train the machine learning model for the current training cycle differ from features used in a different training cycle based on differences in fragments generated based on training documents between the training cycles; and providing the feature descriptor catalog and the trained machine learning model to a classification system for use in classification of documents, wherein the classification system uses the abstract naming schema to generate feature descriptors for fragments of an incoming document such that a feature descriptor generated for a fragment of the incoming document matches a corresponding feature descriptor in the feature descriptor catalog when the fragment has attributes that match attributes of a fragment from the training corpus.

16. The non-transitory computer readable medium of claim 15, wherein the documents are email messages.

17. The non-transitory computer readable medium of claim 16, wherein the first fragment is determined from an email address from the header of the email message.

18. The non-transitory computer readable medium of claim 17, wherein the first fragment is determined from a segment of the email address, the segment comprising a local part, domain part or friendly part of the email address.

19. The non-transitory computer readable medium of claim 18, wherein the class label comprises a spam label.

20. The non-transitory computer readable medium of claim 15, wherein the instructions are further for:

receiving an incoming document;

determining a set of second fragments from the incoming document;

for each second fragment:

determining a second feature descriptor for the second fragment, the second feature descriptor determined based on attributes of the second fragment according to the abstract naming schema that defines portions of the second feature descriptor based on those attributes;

determining a value associated with the second feature descriptor based on the second fragment; and when the second feature descriptor is in the feature descriptor catalog, adding the value for the second feature descriptor to a feature vector for the incoming document in association with the second feature descriptor; and classifying the incoming document by applying the trained machine learning model to the feature vector for the incoming document.

21. The non-transitory computer readable medium of claim 20, wherein the instructions are further for: assigning default values for feature descriptors of the feature descriptor catalog that have no assigned values in the feature vector.

* * * * *